UNITED STATES PATENT OFFICE.

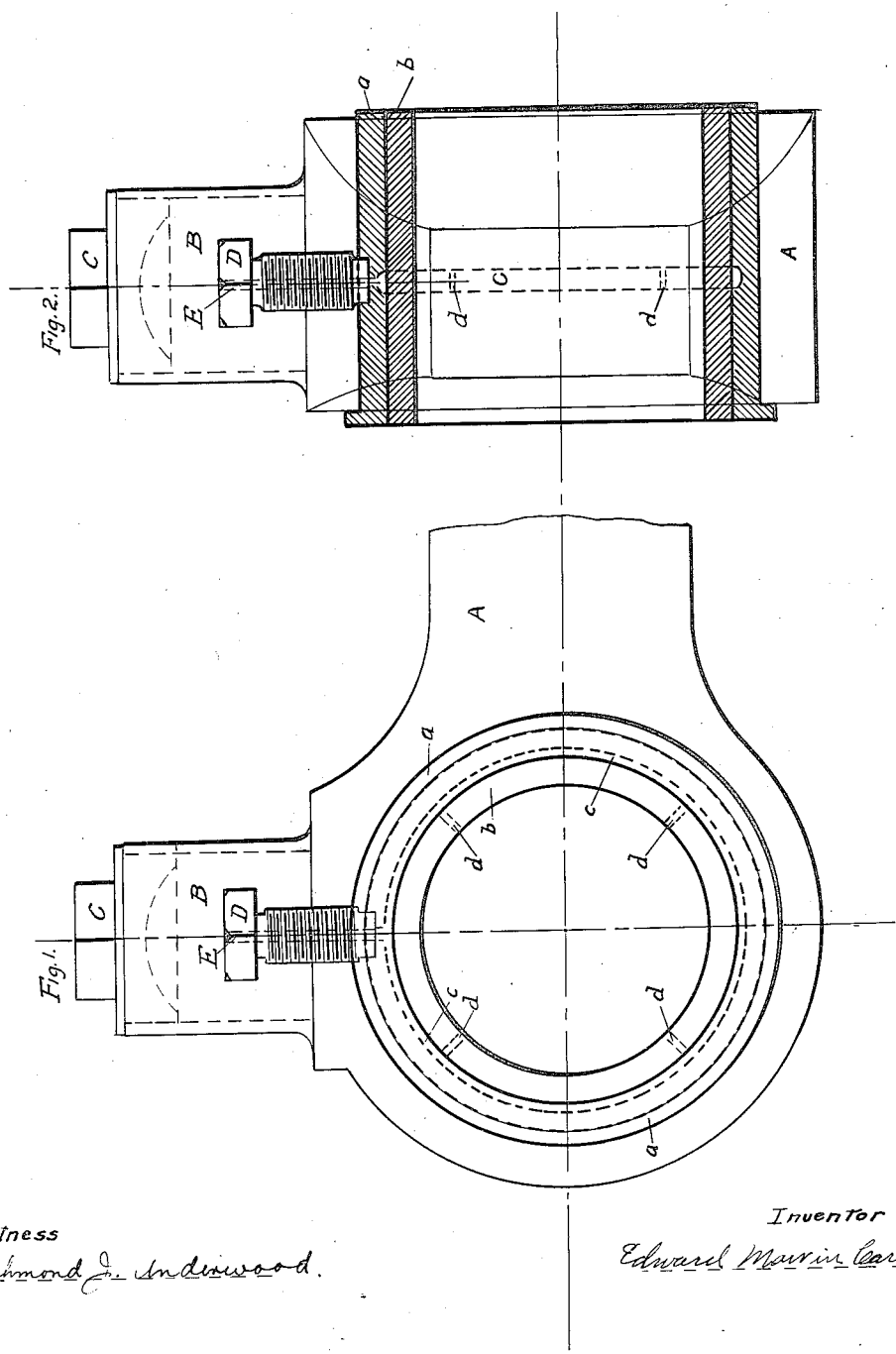

EDWARD MARVIN CARROLL, OF PORT TAMPA CITY, FLORIDA.

COMBINATION ROD-BUSHING FOR LOCOMOTIVE-ENGINES.

1,214,509.  Specification of Letters Patent.  Patented Feb. 6, 1917.

Application filed November 22, 1915. Serial No. 62,769.

*To all whom it may concern:*

Be it known that I, EDWARD MARVIN CARROLL, a citizen of the United States, residing at Port Tampa City, in the county of Hillsborough and State of Florida, have invented a Combination Rod-Bushing for Locomotive-Engines, of which the following is a specification.

This invention relates to improvements in lubricators for rod-bushings and pins for locomotive engines.

The invention has for its object to provide for effectively feeding the lubricant to the pin and to accomplish this in an approved and simple manner.

A further object is to lessen expense by eliminating the necessity of employing the amount of brass in the formation of the lubricator or bushing as has heretofore been the case, the use of cast-steel to the extent of about one half of its constituency being utilized therefor or entering into the same, according to my invention.

The invention consists therefore of the instrumentalities and features of construction substantially as hereinafter fully disclosed and defined by the appended claims.

In the accompanying drawing is illustrated the preferred embodiment of my invention wherein it will be understood that various changes and modifications may be made as to details of construction and arrangement of parts without departing from the scope or breadth of my claims, and in which drawing—

Figure 1 is a front elevation of so much of an engine rod bushing, embodying my invention. Fig. 2 is a vertical transverse section of the same.

It will be understood that similar reference characters are employed in the two figures of the drawing to indicate like parts.

In carrying out my invention, I provide an outer bushing or annulus $a$ of cast-steel, the same constituting about one half of the structure or device and an inner bushing or annulus 7 of brass. The outer bushing $a$ has turned in its inner circumference an annular groove $c$, about one eighth of an inch deep and about one fourth of an inch wide, as clearly indicated in full and dotted lines in the figures of the drawing. The annulus or bushing $b$ has formed therein a suitable number, preferably four, radial passages or ducts $d$ which are arranged at equidistant intervals and are about an eighth of an inch in diameter. These ducts or passages communicate with the groove $c$ and open through the inner circumferential surface of the bushing, thereby delivering lubricant therein received upon the pin of the engine-rod at numerous points so that the same will be properly distributed thereon as presently explained.

A casting B, constituting a lubricant-holding chamber or reservoir upon the rod A, provides for feeding lubricant by gravity into the longitudinal channel E of a keeper or plug D threaded with the rod and having its inner end entering an aperture of the annulus or bushing $a$, and whereby the latter is retained in place, said channel of the keeper or plug D, accordingly providing for feeding or delivering lubricant into the duct or groove $c$ of the annulus or bushing. The annulus or bushing $b$ is functionally retained in effective position within the bushing or annulus $a$.

I claim:

1. A rod bushing for locomotive engines, including a bearing comprising an outer annulus having an annular groove in its inner circumferential surface, an inner annulus fitted within said outer annulus and having a plurality of radial passages communicating with said annular groove and opening through the inner circumferential surface of the annulus, a reservoir, and a plug or keeper having a channel in communication with said reservoir and said annular groove of the outer annulus, said plug having its inner end entering said outer annulus and serving for the retention of the latter.

2. The combination in rod bushing for locomotive engines, of a bearing, comprising outer bushing $a$, made of cast steel, and inner bushing $b$, made of brass, said outer bushing having an inner circumferential groove, one eighth of an inch deep and one fourth of an inch wide, and said inner bushing being provided with holes $d$, one eighth of an inch in diameter, drilled equidistant, a reservoir and a keeper having a channel receiving the contents of the reservoir and delivering said contents into the bushing $a$, said contents being delivered by gravity into the latter, all substantially as shown for the purpose specified.

EDWARD MARVIN CARROLL.

Witnesses:
 RICHMOND J. UNDERWOOD,
 J. HILL JONES.